April 16, 1957     T. F. WUTSCHER     2,788,861
LUBRICATING MEANS FOR ROLLING MILL COUPLING SPINDLES
Filed Oct. 25, 1951     3 Sheets-Sheet 2

INVENTOR.
THEODOR F. WUTSCHER
BY Pollard and Johnston
ATTORNEYS

April 16, 1957 T. F. WUTSCHER 2,788,861
LUBRICATING MEANS FOR ROLLING MILL COUPLING SPINDLES
Filed Oct. 25, 1951 3 Sheets-Sheet 3

INVENTOR.
THEODOR F. WUTSCHER
BY
Pollard and Johnston
ATTORNEYS

United States Patent Office 2,788,861
Patented Apr. 16, 1957

2,788,861

LUBRICATING MEANS FOR ROLLING MILL COUPLING SPINDLES

Theodor F. Wutscher, Parkstone, England, assignor to The Loewy Engineering Company, Limited, London, England, a corporation of Great Britain Application October 25, 1951, Serial No. 253,056

Claims priority, application Great Britain November 17, 1950

2 Claims. (Cl. 184—6)

This invention relates to the lubrication of rolling mill coupling spindles, and in particular to the lubrication of the sliding surfaces inside the spindle heads.

Lubrication of these surfaces has so far been generally effected by hand-operated devices which can only be actuated when the rolling mill is at a standstill. Stoppages of a mill are however normally too infrequent to ensure adequate and efficient lubrication.

It has also been proposed to lubricate the sliding surfaces inside the spindle heads by means of a continuously running pump. If such a pump is arranged at a place apart from the spindle, it is necessary to provide fluid-tight joints between rotating and non-rotating elements on the spindle or its head. Such joints are not easy to realize inasmuch as the wear on the rubbing surfaces of contact between rotating and non-rotating elements is likely to be excessive if the rubbing velocities are high.

In order to avoid these and other difficulties, it has been proposed to arrange a self-contained lubricant supply unit, comprising a storage vessel and a pump, on the spindle itself; but this has led to a cumbersome and complicated structure which, moreover, has not been found to be reliable in operation.

This invention consists, therefore, of an improved lubricating attachment for rolling mill coupling spindles which makes it possible to supply the sliding surfaces inside the spindle heads with lubricant from a continuously running pump arranged at a place apart from the spindle.

The lubricating attachment according to the invention is seated on the spindle itself and comprises a set of alternatively rotating and non-rotating elements in surface contact with each other, a fluid-tight chamber enclosed by rotating and non-rotating elements and situated at the end of a non-rotating element, passage-ways in a non-rotating and a rotating element for feeding lubricant from an external line of supply to said chamber and from there into the spindle head, and labyrinth seals extending along the surfaces of contact between said rotating and non-rotating elements.

The arrangement as described above in which a fluid-tight chamber is interposed between passage-ways in non-rotating and rotating elements permits a smooth and uninterrupted flow of lubricant from an external line of supply into the spindle head so that lubricant can reach the sliding surfaces inside the spindle head in sufficient quantities throughout the operation of the mill.

At the same time the arrangement of this chamber at the end of a non-rotating element makes it possible for the fluid pressure, built up in that chamber, to be utilized for making the labyrinth seals on the surfaces of contact between the rotating and non-rotating elements effective.

The arrangement of the entire lubricating attachment on the spindle itself, instead of on the spindle head as has been proposed before, leads to a reduction of the area of the surfaces of contact between rotating and non-rotating elements and of the rubbing velocity whereby the wear on these surfaces will be greatly diminished.

In a preferred embodiment, a lubricating attachment according to the invention consists of three concentric rings, seated on the spindle, one inside of the other, the inner and outer rings being rotatable with the spindle whilst the intermediate ring is non-rotatable. In the case of this embodiment, the fluid-tight chamber may be formed by axially extending the two rotatable rings beyond that end of the non-rotatable ring which is nearer to the spindle head.

The labyrinth seals on the contacting surfaces of the rings are preferably obtained by providing these surfaces each with a series of alternating collars and grooves, the collars and grooves on one ring being axially staggered with respect to those on the adjoining ring, so that upon assembly of the said rings, the collars on one ring will inter-engage and interlock with those on the other.

According to a further feature of the invention, the non-rotating element of the attachment is held against rotation by a linkage mechanism. Thus, the non-rotating element is pivotally connected to brackets which are slidable on a connecting member. This linkage mechanism makes it possible to keep the non-rotating elements free from any outside pressure which might cause misalignment of the elements. Hence the elements can adjust themselves freely on their seats, irrespective of any movement of the spindles to which they are attached. One and the same connecting member may be adapted to carry the non-rotating elements of more than one spindle.

The invention will now be described with reference to the accompanying drawings in which one embodiment of the invention is shown by way of example:

Figure 1:
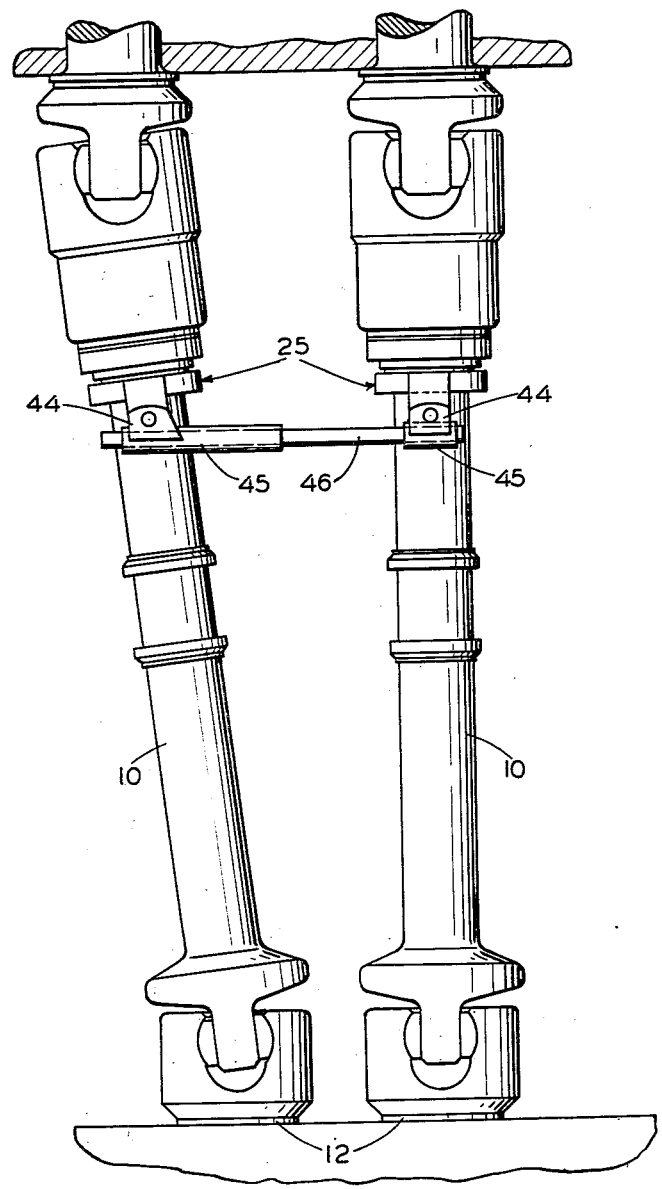
Fig. 1 is an elevation of the coupling spindles of a two-high rolling mill and of the adjoining parts of the mill rolls and pinions to which the spindles are attached.

In the drawings, the two coupling spindles 10 are shown as connecting a pair of rolls 11 of a two-high rolling mill stand to their driving pinions 12, the spindles 10 being articulated to the rolls and pinions so that they can assume an inclined position when the rolls are moved out of axial alignment with the pinions.

Figure 2:
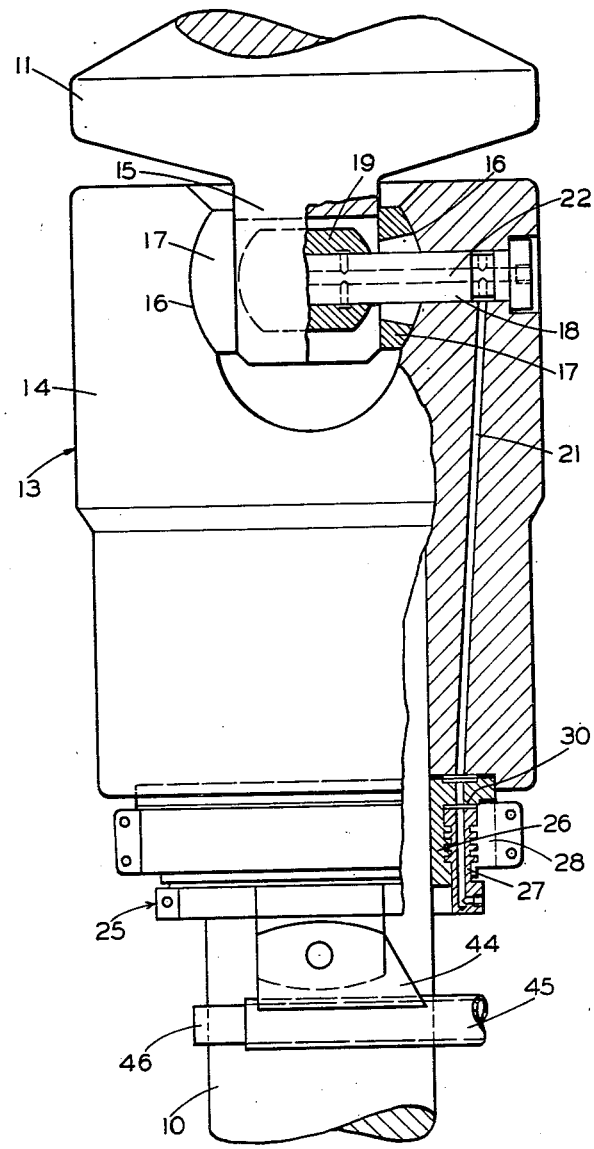
Fig. 2 is an elevation, partly in section, on a larger scale, of the end of a coupling spindle to which the lubricating attachment according to the invention has been fitted.

One form of articulated connection between a spindle 10 and roll 11 is shown in Fig. 2.

The spindle 10 has a head 13 which may either be firmly secured to the spindle or formed integrally therewith. The head is forked at its end and the cavity between the prongs 14 of the head is adapted to receive a substantially rectangular extension or tongue 15 of the roll 11. The internal surfaces of the prongs 14 are hollowed out and are shaped as surfaces of rotation 16 about an axis perpendicular to the spindle 10. The means for transmitting a torque from the spindle head 13 to the roll 11 consist of slippers 17 which are interposed between the surfaces 16 of the prongs 14 and the flat surfaces of tongue 15. These slippers will permit the spindle 10 to assume an inclined position relative to the roll 11 whenever the latter is displaced relative to its pinion 12.

In order to locate the tongue 15 relative to the spindle head, a crosspin 18 is secured to spindle head 13 which passes through a slot in tongue 15 and extends in a direction perpendicular both to the axis of the spindle 10 and to that of the surfaces of rotation 16. A block 19 is further inserted in the slot in tongue 15 and seated on pin 18 so as to be rotated thereon.

If one of the spindles 10 is inclined to the horizontal, as is the case with the upper spindle 10 in Fig. 1, the angle between the axis of rotation of that spindle and the axis of the pin 18 will vary during one full revolution of the spindle from a maximum to a minimum, and again to a maximum, or, in other words, the spindle 10 will oscillate relative to the pin 18. This, in turn, will cause the slippers 17 to swivel over the tongue 15, and will cause the block 19 to swivel about pin 18.

It is therefore necessary to provide for ample lubrication of the various sliding surfaces on the slippers 17 and the block 19. To this end the spindle head 13 has two or more longitudinal passage-ways 21 which interconnect an external line of lubricant supply (not shown here) with bores, such as bore 22 in pin 18, which lead to the afore-mentioned sliding surfaces.

Figure 3B:
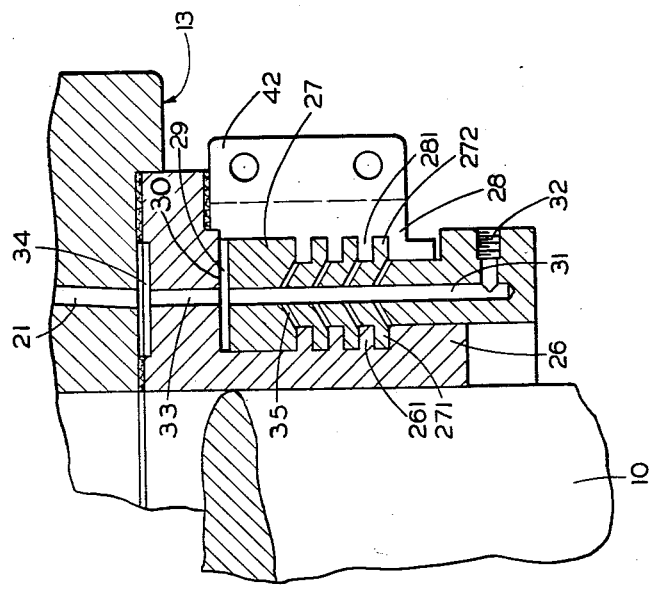
Figs. 3A and 3B are radial half-sections through the lubricating attachment according to the invention on a still larger scale.
Figure 3A:
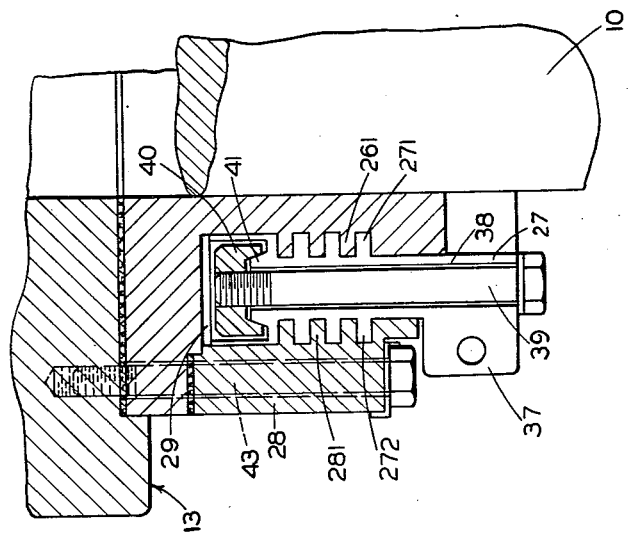

The means for connecting the passage-ways 21 to the external line of supply are provided by a lubricating attachment 25 which constitutes the present invention and which will now be described in detail with reference to Figs. 2, 3A and 3B.

The lubricating attachment according to the invention is seated directly on the spindle 10 itself, immediately behind the spindle head 13. It consists of three concentric rings, 26, 27 and 28, one placed inside the other and of which the inner and outer rings 26 and 28 respectively are rotatable with the spindle and constitute what is hereinafter referred to as rotatable means whilst the intermediate ring 27 is held against rotation by means presently to be described and constitutes what is hereinafter referred to as non-rotatable means. A fluid-tight chamber 29 is located at the end of the intermediate ring 27 facing the spindle head 13, the chamber being obtained by axially extending the two rings 26 and 28 beyond the ring 27. The ring 26 has an external flange 30 cooperating with a portion of the ring 28 in order to close the chamber 29 at the side opposite the ring 27 whilst the ring 28 closes the chamber 29 around its outer periphery.

The ring 27 has one or more longitudinal bores 31 which are attached at 32 to the external line of supply by a flexible connection (not shown) which permits the spindle 10 to assume an inclined position. The bore 31 terminates at the chamber 29 from which further bores 33 in flange 30 lead to the passage-ways 21 in the spindle head 13. A further circular chamber 34 is interposed between the flange 30 and the spindle head 13.

The object of the chamber 29 is to permit a smooth and continuous passage of lubricant from a non-rotating means—such as the ring 27—to a rotating means—such as the rings 26 and 28. As will be seen from Figs. 3A and 3B, the chamber 29 is of annular shape and extends radially from the contacting surfaces between rings 26 and 27 to the contacting surfaces between rings 27 and 28.

In order to prevent any leakage of lubricant from the chamber 29 along these surfaces, the latter are, at least for part of their length, so contoured as to constitute labyrinth seals. To this end the ring 26 has external collars 261, the ring 27 has internal as well as external collars 271 and 272 respectively, and the ring 28 has internal collars 281. The collars 261 are staggered relative to the collars 271 and the collars 272 are staggered relative to the collars 281, the rings having complementary grooves between their collars into which the collars of the other rings fit so that the three rings 26, 27 and 28 are interlocked with each other.

As the labyrinth seals between the rings 26, 27 and 28 are co-extensive with the chamber 29 in the radial direction, the pressure of lubricant which is built up in that chamber acts as an axial thrust on the collars 261, 271, 272 and 281 so as to keep them in close contact with each other; thus the pressure of the lubricant itself is utilized to render the labyrinth seals effective which are thereby made self-sealing.

Narrow oblique channels 35 which branch off the bores 31 are provided for the purpose of supplying sufficient lubricant to all contact faces between rings 26, 27 and 28.

In view of the fact that the three rings 26, 27 and 28 interlock with each other when in position on the spindle 10, each of them has to be made of at least two parts which are separately placed on the spindle, to be assembled when in position.

In the case of the inner ring 26 and the intermediate ring 27, special means for fastening the two ring halves together at one end have to be provided as for reasons of space it is not possible to provide these rings with external flanges at both ends through which fastening means could be passed. One form of securing the two halves of one ring to each other is shown in Fig. 3A in connection with the intermediate ring 27. Each of the two halves of this ring is provided at the faces along which the halves are to be joined together, with a flange 37 on one end of the ring through which fastening means can be passed. A bore 38 extends along the split of the half-rings into which headed bolts 39 are fitted, when the halves have been positioned on the spindle 10. The bolts carry nuts 40 which have conical recesses at their undersides, fitting over correspondingly shaped bosses 41 on the two half-rings. The flange 30 is provided with a suitable aperture (not shown here) through which the nuts 40 can be manipulated for tightening. Similar means can be provided for joining together the two halves of the ring 26.

The outer ring 28 is provided with flanges 42 through which fastening means such as bolts (not shown here) can be passed as no space limitations exist with respect to this ring which make the arrangement of a flange impracticable.

The inner and outer rings 26 and 28 respectively are secured to the spindle head 13 by a number of headed screw bolts 43, whereby the two rings are caused to rotate together with the spindle 10.

The intermediate ring 27 on each of the spindles 10 is held against rotation by a linkage mechanism common to the plurality of spindles which includes brackets 44 pivotally connected to ring 27, tubes 45 attached to brackets and a connecting member 46 adjacent spindles 10 on which said tubes 45 are slidably movable during movement of the spindles relative to each other when the mill is in operation. This enables the rings 27 to follow freely the angular displacements of the spindles 10 and to align themselves with the rings 26 and 28 of the attachment, without any risk of the collars 271 and 272 of the rings 27 becoming jammed with the interlocking collars 261 and 281 of the other rings.

As the lubricating attachment according to the invention is seated direct on the spindle 10 and not on the spindle head 13, it can be built as a very compact unit which does not protrude radially beyond the outer surfaces of the spindle head. It is in fact possible, as shown in the figures, to make the rings 26, 27 and 28 of substantially smaller diameter than the spindle head whereby the rubbing velocity between the rotating and non-rotating elements of the lubricating attachment and hence the wear on them is greatly reduced.

In the example shown and described, the lubricating attachment according to the invention is applied to the spindle head at the rolling mill end of the coupling spindle. It is however to be understood that similar attachments can be applied to the spindle heads at the pinion-stand end of the spindle.

What I claim is:

1. Lubricating means for articulated coupling spindles of a rolling mill in which the spindle head is of larger diameter than the spindle itself and has internal passageways for feeding a lubricant to sliding surfaces inside the head, comprising an assembly of at least three elements having co-axial sleeve portions of different diameters, the smaller of said elements being fitted inside the next larger element, said elements being mounted on the spindle in close proximity to the head, the innermost and the outermost of said elements being connected to said spindle so as to rotate therewith, means for holding the intermediate element against rotation, said elements forming together an annular lubricant collecting and distributing chamber, disposed adjacent the spindle head, said intermediate element having bores for feeding a lubricant under pressure from an external line of supply to said chamber, one of said rotary elements having bores for feeding the lubricant from said chamber to the passageways in the spindle head, and fluid-tight labyrinth seals, between the sleeve portions of said elements, said seals being located within a zone which is subjected to the pressure of the lubricant, contained in said chamber so that said seals are placed under sealing pressure by the lubricant.

2. Lubricating means for a plurality of articulated rolling mill coupling spindles each interconnecting driving and driven elements and having enlarged heads with internal passageways for feeding a lubricant to sliding surfaces inside the head, comprising rotatable means mounted on each spindle for rotation therewith, non-rotatable means mounted on each spindle adjacent to said rotatable means and cooperating therewith to form a lubricant collecting chamber, a plurality of bores provided in said non-rotatable means and in said rotatable means for respectively feeding a lubricant under pressure from an external line of supply to the lubricant collecting chamber and delivering lubricant from such chamber to the passageways in each spindle head, a linkage mechanism common to said spindles and connected to said non-rotatable means on each spindle for preventing rotation of said non-rotatable means while permitting independent movement of each spindle during operation of the rolling mill.

References Cited in the file of this patent

UNITED STATES PATENTS

| | | |
|---|---|---|
| 1,041,773 | Geer | Oct. 22, 1912 |
| 1,115,433 | Hunt | Oct. 27, 1914 |
| 1,667,455 | Burns | Apr. 24, 1928 |
| 2,255,515 | Popper | Sept. 9, 1941 |
| 2,364,133 | LaRoza | Dec. 5, 1944 |
| 2,469,588 | Aschauer | May 10, 1949 |
| 2,586,991 | Postel | Feb. 26, 1952 |

FOREIGN PATENTS

| | | |
|---|---|---|
| 165,557 | Austria | Mar. 25, 1950 |
| 369,463 | Germany | July 15, 1921 |